United States Patent
Sawada et al.

(10) Patent No.: US 8,455,579 B2
(45) Date of Patent: Jun. 4, 2013

(54) METHOD FOR PROMOTING CRYSTALLIZATION OF BIODEGRADABLE RESIN COMPOSITION

(75) Inventors: Hiroki Sawada, Wakayama (JP); Shogo Nomoto, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/256,974

(22) PCT Filed: Mar. 16, 2010

(86) PCT No.: PCT/JP2010/054402
§ 371 (c)(1),
(2), (4) Date: Sep. 16, 2011

(87) PCT Pub. No.: WO2010/107014
PCT Pub. Date: Sep. 23, 2010

(65) Prior Publication Data
US 2012/0016065 A1    Jan. 19, 2012

(30) Foreign Application Priority Data
Mar. 19, 2009    (JP) .................................. 2009-068523

(51) Int. Cl.
*C08K 5/20* (2006.01)

(52) U.S. Cl.
USPC ........................................................ 524/223

(58) Field of Classification Search
USPC ................... 524/230, 231, 232, 223
See application file for complete search history.

(56) References Cited

U.S. PATENT DOCUMENTS

| | | | |
|---|---|---|---|
| 2008/0262150 A1 | 10/2008 | Takenaka et al. |
| 2010/0063177 A1 | 3/2010 | Takenaka et al. |
| 2010/0130651 A1 | 5/2010 | Fukawa et al. |
| 2010/0210756 A1 | 8/2010 | Takenaka et al. |
| 2010/0331446 A1 | 12/2010 | Takenaka et al. |
| 2011/0124770 A1 | 5/2011 | Takenaka et al. |

FOREIGN PATENT DOCUMENTS

| JP | 63-060956 | * | 3/1988 |
|---|---|---|---|
| JP | 2006-176747 A | | 7/2006 |
| JP | 2008-174718 | * | 7/2007 |
| JP | 2008-31376 A | | 2/2008 |
| JP | 2008-115372 A | | 5/2008 |
| JP | 2009-24081 A | | 2/2009 |
| JP | 2009-185244 A | | 8/2009 |
| JP | 2010-1338 A | | 1/2010 |
| JP | 2010-31203 A | | 2/2010 |
| WO | WO 2009/004769 A1 | | 1/2009 |

OTHER PUBLICATIONS

Machine translation of JP 2006-176747. Jul. 2006.*
Machine translation JP 2008-174718. Jul. 2008.*
International Search Report for International Application No. PCT/JP2010/054402 dated Jun. 15, 2010.
Notification of the First Office Action for corresponding Chinese Patent Application No. 201080019626.7, dated Dec. 14, 2012.

* cited by examiner

*Primary Examiner* — John Uselding
(74) *Attorney, Agent, or Firm* — Birch, Stewart, Kolasch & Birch, LLP

(57) ABSTRACT

A method for promoting crystallization of a biodegradable resin composition, including the step of melt-kneading a raw material containing ethylenebis 12-hydroxystearic amide having an amine value of 1.0 mg KOH/g or less and a biodegradable resin. Since the biodegradable resin composition obtainable by the method for promoting crystallization of the present invention has favorable crystallization velocity, a time period required upon molding the composition is shortened, whereby a molded article can be produced productively. The biodegradable resin composition can be suitably used in, for example, in various industrial applications, such as daily sundries, household electric appliance parts, and automobile parts.

6 Claims, 1 Drawing Sheet

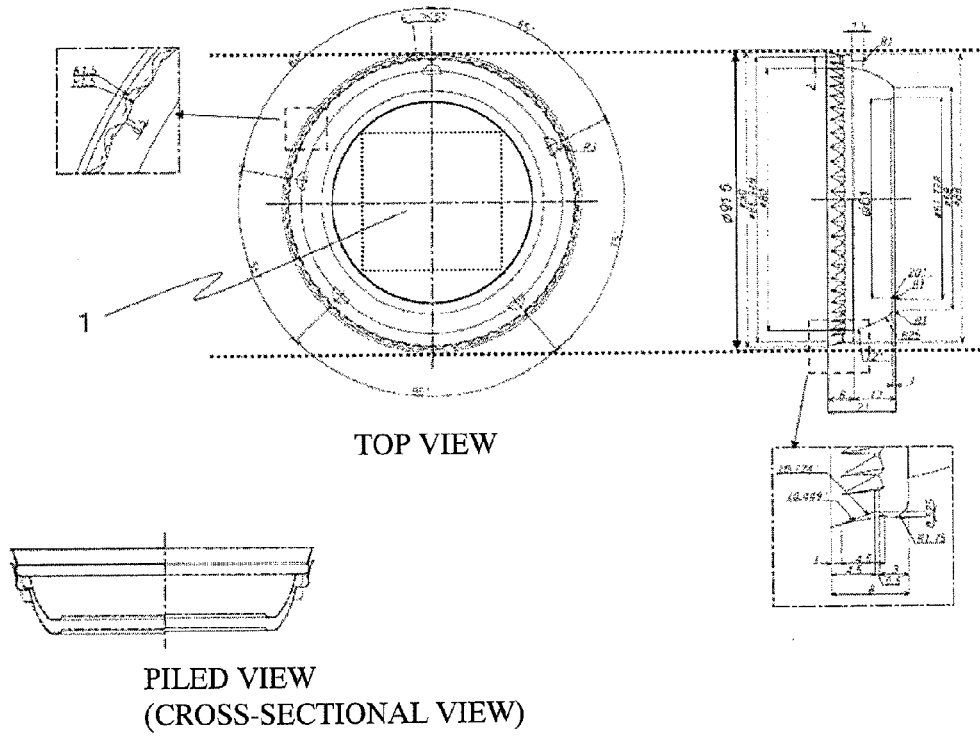

METHOD FOR PROMOTING CRYSTALLIZATION OF BIODEGRADABLE RESIN COMPOSITION

This application is a National Phase application of PCT/JP2010/054402 filed on Mar. 16, 2010, which claims the benefit under 35 U.S.C. §119(a) to Patent Application No. 2009-068523 filed in Japan, on Mar. 19, 2009. The entire contents of all of the above applications are hereby incorporated by reference.

TECHNICAL FIELD

The present invention relates to a method for promoting crystallization of a biodegradable resin composition. More specifically, the present invention relates to a method for promoting crystallization of a biodegradable resin composition using a particular crystal nucleating agent, a biodegradable resin composition of which crystallization is promoted by the method, and a molded article of the above biodegradable resin composition.

BACKGROUND ART

Biodegradable resins begin to degrade in several weeks by actions of enzymes produced by microorganisms living in nature in a case where the biodegradable resins are placed in soil, sea waters, or inside the body of animals, and disappear during a period of about an year to several years. Therefore, in recent years, utilization of the resins is being remarked.

For example, Patent Publication 1 discloses a method of obtaining a biodegradable resin composition having favorable crystallization velocity and transparency, in which heat treatment is carried out by melt-kneading at a particular temperature a biodegradable resin, a plasticizer, and a crystal nucleating agent which is an aliphatic compound having two or more groups of at least one selected from the group consisting of an ester group, a hydroxyl group, and an amide group in one molecule. The above-mentioned crystal nucleating agent is exemplified by fatty acid esters such as fatty esters and hydroxyfatty acid esters; fatty amides such as hydroxyfatty acid monoamides, fatty bisamides and hydroxyfatty acid bisamides; and metal salts of aliphatic acids such as metal salts of hydroxyaliphatic acids;

PRIOR ART PUBLICATIONS

Patent Publications

Patent Publication 1: Japanese Patent Laid-Open No. 2006-176747

SUMMARY OF THE INVENTION

The present invention relates to:
[1] a method for promoting crystallization of a biodegradable resin composition, including the step of melt-kneading a raw material containing ethylenebis 12-hydroxystearic amide having an amine value of 1.0 mg KOH/g or less and a biodegradable resin;
[2] a biodegradable resin composition formable or formed by promoting crystallization according to the method for promoting crystallization as defined in the above-mentioned [1]; and
[3] a biodegradable resin molded article wherein the biodegradable resin composition as defined in the above-mentioned [2] is molded.

BRIEF DESCRIPTION OF THE DRAWINGS

FIG. 1 is a view showing a molded article obtained by using a vacuum forming machine.

EXPLANATION OF NUMERALS

1 Sampling side used in evaluation of transparency

DETAILED DESCRIPTION OF THE INVENTION

With the further demands of the market in the recent year, it has been found that further speeding up of the crystallization velocity is in demand, and conventional techniques are unsatisfactory.

The present invention relates to a method for promoting crystallization of a biodegradable resin composition, a biodegradable resin composition of which crystallization is promoted by the above method, and a molded article of the above biodegradable resin composition.

The biodegradable resin composition of which crystallization is promoted by the method for promoting crystallization of a biodegradable resin composition of the present invention has favorable crystallization velocity, so that the time period required for molding the composition is shortened, thereby making it possible to produce a molded article productively.

The method for promoting crystallization of a biodegradable resin composition of the present invention includes the step of melt-kneading a raw material containing a crystal nucleating agent and a biodegradable resin, a great feature of which is in that the crystal nucleating agent is ethylenebis 12-hydroxystearic amide having a particular amine value.

Ethylenebis 12-hydroxystearic amide is used as a lubricant or an anti-blocking agent for a thermoplastic resin. In addition, the amide is a compound having two each of hydroxyl groups that contribute to dispersibility and amide groups that contribute to compatibility, which is also used as a crystal nucleating agent for a polylactic acid resin. This compound is obtained by subjecting 12-hydroxystearic acid and ethylenediamine to a dehydration condensation reaction, and the resulting reaction product contains an amine, such as unreacted ethylenediamine, a reaction intermediate monoamide amine, or a by-product imidazoline. These amines are not preferable because not only they give causations to coloration during storage or heating of ethylenebis 12-hydroxystearic amide, but also there are some concerns on safety in human bodies. Although the detailed reasons are not clarified, it is found that a biodegradable resin composition obtained from an ethylenebis 12-hydroxystearic amide containing the amine causes not only worsening in color but also the lowering in crystallization velocity. In view of the above, in the present invention, it is possible to promote crystallization of the biodegradable resin composition by using ethylenebis 12-hydroxystearic amide having an amine value of 1.0 mg KOH/g or less as a crystal nucleating agent. Here, in the present invention, the ethylenebis 12-hydroxystearic amide having an amine value of 1.0 mg KOH/g or less means a crystal nucleating agent having an amine value of 1.0 mg KOH/g or less, which is constituted by ethylenebis 12-hydroxystearic amide.

The method for promoting crystallization of a biodegradable resin composition of the present invention includes the step of melt-kneading a raw material containing ethylenebis 12-hydroxystearic amide having an amine value of 1.0 mg KOH/g or less, which is a crystal nucleating agent, and a biodegradable resin (hereinafter also referred to as melt-kneading step).

<Crystal Nucleating Agent>

The ethylenebis 12-hydroxystearic amide used in the present invention has an amine value of 1.0 mgKOH/g or less, and preferably 0.5 mgKOH/g or less. Also, the amide has an amine value of preferably 0.01 mgKOH/g or more, from the viewpoint of productivity. Therefore, the ethylenebis 12-hydroxystearic amide used in the present invention has an amine value of preferably from 0.01 to 1.0 mgKOH/g, and more preferably from 0.01 to 0.5 mgKOH/g. The amine value as used herein means a total amount of amines, which is also referred to as a total amine value. The amine value can be measured in accordance with the method described in Examples set forth below.

So long as an ethylenebis 12-hydroxystearic amide has an amine value of 1.0 mgKOH/g or less, the amide may be a commercially available product, or a product synthesized according to a method known in the art (for example, a method described in Japanese Patent Laid-Open No. Sho-63-60956).

Specific examples for a method of synthesizing an ethylenebis 12-hydroxystearic amide having an amine value of 1.0 mgKOH/g or less will be given hereinbelow.

An ethylenebis 12-hydroxystearic amide is obtained by using 12-hydroxystearic acid and ethylenediamine as raw materials, and subjecting the raw materials to a dehydration condensation reaction, and in order to reduce an amine content of unreacted ethylenediamine or a reaction intermediate monoamide amine in the reaction product obtained so that an amine value is 1.0 mgKOH/g or less, a molar ratio of the raw materials used in the above-mentioned dehydration condensation reaction is adjusted, and it is preferable that a molar ratio of 12-hydroxystearic acid to ethylenediamine, i.e. 12-hydroxystearic acid/ethylenediamine, is 2.0/1 or more. In addition, the above-mentioned molar ratio is preferably 2.20/1 or less, and more preferably 2.15/1 or less, from the viewpoint of reducing the content of an unreacted 12-hydroxystearic acid in the reaction product obtained, thereby inhibiting formation of by-products of a condensate of 12-hydroxystearic acid. Therefore, the above-mentioned molar ratio is preferably from 2.0/1 to 2.20/1, and more preferably from 2.0/1 to 2.15/1.

The dehydration condensation reaction is carried out in an inert gas atmosphere such as nitrogen, under an ambient pressure (101.3 kPa). The reaction temperature is preferably from 180° to 230° C., and more preferably from 190° to 220° C. If a reaction temperature is 180° C. or higher, a reaction proceeds efficiently, and if a reaction temperature is 230° C. or lower, a reaction product obtained has a favorable color. Although a reaction time cannot be unconditionally determined depending upon a molar ratio of raw materials and a reaction temperature, it is preferable that a reaction time is a time period during which 12-hydroxystearic acid and ethylenediamine are allowed to sufficiently react with each other, and it is preferable that a reaction time is usually from 3 to 7 hours.

Thus, an ethylenebis 12-hydroxystearic amide having an amine value of 1.0 mgKOH/g or less can be synthesized.

In addition, in the present invention, an ethylenebis 12-hydroxystearic amide of which amine value exceeds 1.0 mgKOH/g is purified in accordance with a known method, thereby reducing its amine value to 1.0 mgKOH/g or less may be used. Furthermore, the ethylenebis 12-hydroxystearic amide obtained by the above-mentioned method for synthesis and further purified to reduce its amine value may be used.

Specific examples are given hereinbelow on a method for purifying an ethylenebis 12-hydroxystearic amide.

The ethylenebis 12-hydroxystearic amide is purified by thermal cleaning and/or crystallization using at least one solvent selected from the group consisting of alcoholic solvents, aromatic hydrocarbon solvents, ketone solvents, and ester solvents. Here, in a case where two or more kinds of solvents are used, the solvents can be used as a mixed solvent.

The alcoholic solvents include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, ethylene glycol monomethyl ether, ethylene glycol monoethyl ether, and the like. In the purification according to thermal cleaning, methanol, ethanol, 1-propanol, 2-propanol, 1-butanol, 2-butanol, 2-methyl-1-propanol, and 2-methyl-2-propanol are preferred, from the viewpoint of obtaining an ethylenebis 12-hydroxystearic amide having a low amine value. In addition, in the purification according to crystallization, 1-propanol, 2-propanol, 1-butanol, 2-butanol, 2-methyl-1-propanol, and 2-methyl-2-propanol are preferred, from the viewpoint of obtaining an ethylenebis 12-hydroxystearic amide having a low amine value.

The aromatic hydrocarbon solvents include toluene, o-xylene, m-xylene, p-xylene, ethylbenzene, and the like, and among them, toluene is preferred.

The ketone solvents include acetone, methyl ethyl ketone, methyl isobutyl ketone, and the like, and among them, methyl ethyl ketone and methyl isobutyl ketone are preferred.

The ester solvents include ethyl acetate, n-propyl acetate, n-butyl acetate, isobutyl acetate, sec-butyl acetate, and the like.

In both the thermal cleaning and crystallization, an ethylenebis 12-hydroxystearic amide to be purified (hereinafter also referred as unpurified bisfatty acid amide) is heated in at least one member of a solvent of the solvents mentioned above under an ambient pressure or under pressure (0.1 to 10 MPa) to suspend or dissolve. Thereafter, the suspension or solution is cooled, and filtered under a reduced pressure (0.001 to 0.09 MPa) or under pressure (0.11 to 0.5 MPa) to collect the filtered products, and the products are cleaned and dried. Here, taking a series of procedures mentioned above as a run, thermal cleaning alone may be carried out for a plural runs, or crystallization alone may be carried out for a plural runs, or thermal cleaning and crystallization may be used in combination, in which case solvents used in these runs may be identical or different for each run.

The amount of a solvent usable in suspending or dissolving an unpurified bisfatty acid amide is preferably from 100 to 10,000 parts by weight, more preferably from 200 to 3,000 parts by weight, and even more preferably from 300 to 1,500 parts by weight, based on 100 parts by weight of the unpurified bisfatty acid amide. When the amount of the solvent is 100 parts by weight or more, viscosity of a suspension or solution would not be too high, thereby providing excellent operability of filtration. When the amount is 10,000 parts by weight or less, loss of the ethylenebis 12-hydroxystearic amide is reduced, thereby making it economically advantageous.

It is desired that the heating that is carried out upon suspending or dissolving is carried out at a temperature of preferably from 50° to 180° C., more preferably from 50° to 150° C., and even more preferably from 80° to 130° C. The heating time is preferably from 0.5 to 10 hours.

It is desired that the cooling after the heating is carried out at a temperature of preferably from 5° to 40° C., more preferably from 10° to 40° C., and even more preferably from 15° to 40° C.

A method for filtration is not particularly limited, and the method can be carried out in accordance with a known method. Here, the filtrate contains an unreacted raw material (ethylenediamine, 12-hydroxystearic acid), or a reaction intermediate (monoamide amine), and the residue obtained has a reduced amine content.

The filtered residue is subjected to cleaning because the residue contains some residual solution from the filtrate. A method for cleaning is not particularly limited, and the method can be carried out using a solvent that is different from or identical to the solvent used in suspending or dissolving mentioned above, at a temperature of preferably from 10° to 80° C., and more preferably from 10° to 60° C. The number of cleanings is preferably from 1 to 5, and more preferably from 1 to 3.

An amount of a solvent used in a single cleaning is preferably from 10 to 2,000 parts by weight, more preferably from 100 to 1,000 parts by weight, even more preferably from 100 to 500 parts by weight, based on 100 parts by weight of the residue.

It is desired that the drying is carried out under an ambient pressure, or a reduced pressure of preferably 15 kPa or less, and more preferably 6.7 kPa or less. The drying temperature is preferably from 10° to 180° C., preferably from 40° to 150° C., and even more preferably from 60° to 120° C.

Thus, a purified product of ethylenebis 12-hydroxystearic amide of which amine value is reduced (hereinafter also referred to as purified bisfatty acid amide) is obtained. Here, in the present invention, so long as a mixture obtained by mixing an unpurified bisfatty acid amide and a purified bisfatty acid amide obtained by the purification method mentioned above has an amine value of 1.0 mgKOH/g or less, the mixture may be used.

The ethylenebis 12-hydroxystearic amide having an amine value of 1.0 mgKOH/g or less has an acid value of preferably 1.0 mgKOH/g or less, more preferably 0.6 mgKOH/g or less, and even more preferably 0.4 mgKOH/g or less. Here, in the present invention, an ethylenebis 12-hydroxystearic amide having an acid value of 1.0 mgKOH/g or less means a crystal nucleating agent having an acid value of 1.0 mgKOH/g or less, which is constituted by an ethylenebis 12-hydroxystearic amide. The acid value as used herein can be measured in accordance with the method described in Examples set forth below.

Incidentally, an ethylenebis 12-hydroxystearic amide obtained in accordance with a method described in Japanese Patent Laid-Open No. Sho-63-60956 has an amine value of 1.0 mgKOH/g or less, and highly pure. However, in the method, the reaction is stopped at a point when a conversion rate of the raw material to bisamide is from 85 to 98%, and subsequently unreacted components containing monoamide amine are removed by thin-film distillation, thereby producing highly pure fatty acid bisamide. Therefore, the procedures are complicated, and the productivity is low. In addition, since the bisamide obtained does not have a sufficient color, among the ethylenebis 12-hydroxystearic amides having an amine value of 1.0 mgKOH/g or less, it is preferable in the present invention to use an ethylenebis 12-hydroxystearic amide purified by the purification method mentioned above. The color of the purified bisfatty acid amide is preferably 2 Gardner or less, and more preferably 1 Gardner or less. The color as used herein can be measured in accordance with the method described in Examples set forth below.

In addition, in the present invention, in a case where a biodegradable resin composition is melt-crystallized, in other words, cooled from a molten state to a die temperature as in injection molding, and kept in the mold to allow crystallization, the higher the solidification point of an ethylenebis 12-hydroxystearic amide used in a biodegradable resin composition, the more favorable, from the viewpoint of obtaining a biodegradable resin of which crystallization is promoted. The ethylenebis 12-hydroxystearic amide having an amine value of 1.0 mgKOH/g or less has a solidification point of preferably from 135° to 145° C., more preferably from 136° to 144° C., even more preferably from 138° to 143° C., and still even more preferably from 139° to 143° C., from the viewpoint mentioned above. In addition, in a case where an ethylenebis 12-hydroxystearic amide is purified according to the purification method mentioned above, a crystallization method by which a purified product has a higher solidification point is preferred, from the viewpoint of obtaining a biodegradable resin composition of which crystallization is promoted. The solidification point as used herein is obtained from a temperature of exothermic peak of crystallization, observed when using a DSC apparatus (manufactured by Perkin-Elmer, Diamond DSC), melting at 200° C. for 2 minutes, and then cooling to 25° C. at a rate of 10° C./minute.

In the present invention, other crystal nucleating agents than the ethylenebis 12-hydroxystearic amide may be contained within the range that would not impair the effects of the present invention.

Other crystal nucleating agents are preferably crystal nucleating agents listed in Japanese Patent Laid-Open Nos. 2008-174718 and 2008-115372, from the viewpoint of bending strength and moldability of a biodegradable resin composition. Specifically, at least one member selected from the group consisting of a compound having a hydroxyl group and an amide group in one molecule excluding an ethylenebis 12-hydroxystearic amide having an amine value of 1.0 mgKOH/g or less, metal salts of phenylphosphonic acids, phthalocyanines, metal salts of phosphoric esters, metal salts of dialkyl esters of aromatic sulfonic acids, metal salts of rosin acids, aromatic carboxylic acid amides, rosin amides, carbohydrazides, N-substituted ureas, salts of melamine compounds, and uracils is preferred. Of the crystal nucleating agents as used herein, a compound having a hydroxyl group and an amide group in one molecule including an ethylenebis 12-hydroxystearic amide having an amine value of 1.0 mgKOH/g or less may be referred to as a crystal nucleating agent (1), and the others may be referred to as a crystal nucleating agent (2).

The crystal nucleating agent (1) excluding an ethylenebis 12-hydroxystearic amide having an amine value of 1.0 mgKOH/g or less is preferably hydroxyfatty acid bisamides, such as hexamethylenebis 12-hydroxystearic amide, and 12-hydroxystearic triglyceride, and more preferably ethylenebis 12-hydroxystearic amide, from the viewpoint of moldability, heat resistance, and impact resistance of the biodegradable resin composition, and anti-blooming property of the crystal nucleating agent.

Among the crystal nucleating agents (2), the metal salts of phenylphosphonic acids are preferred, from the viewpoint of crystallization velocity. The metal salt of a phenylphosphonic acid is a metal salt of a phenylphosphonic acid having a phenyl group which may have a substituent and a phosphonic group ($-PO(OH)_2$), wherein the substituent for the phenyl group includes an alkyl group having 1 to 10 carbon atoms, an alkoxycarbonyl group of which alkoxy group has 1 to 10 carbon atoms, and the like. Specific examples of the phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal of the metal salt of a phenylphosphonic acid includes lithium, sodium, magnesium, aluminum, potassium, calcium, barium, copper, zinc, iron, cobalt, nickel, and the like, and zinc is preferred.

These crystal nucleating agents can be used alone or in a combination of two or more kinds.

In a case where a crystal nucleating agent (1) and a crystal nucleating agent (2) are used in combination, the weight ratio of the crystal nucleating agent (1) to the crystal nucleating agent (2), i.e., the crystal nucleating agent (1)/the crystal nucleating agent (2), is preferably from 20/80 to 80/20, more preferably from 30/70 to 70/30, and even more preferably from 40/60 to 60/40.

The ethylenebis 12-hydroxystearic amide having an amine value of 1.0 mgKOH/g or less is contained in the crystal nucleating agent in an amount of preferably 80% by weight or more, more preferably 90% by weight or more, and even more preferably substantially 100% by weight.

The crystal nucleating agent is contained in an amount of preferably from 0.1 to 5 parts by weight, more preferably from 0.5 to 3 parts by weight, and even more preferably from 0.5 to 2 parts by weight, based on 100 parts by weight of the biodegradable resin, from the viewpoint of moldability of the biodegradable resin composition. Here, the phrase " . . . contained in an amount" as used herein means " . . . contained in an amount or formulated in an amount."

<Biodegradable Resin>

The biodegradable resin may be any resin having a property capable of being degraded to low molecular compounds by microorganisms in nature, and the biodegradable resin includes, for example, aliphatic polyesters such as polyhydroxy butyrate, polycaprolactone, polybutylene succinate, polybutylene succinate/adipate, polyethylene succinate, polylactic acid resin, polymalic acid, polyglycolic acid, polydioxanone, and poly(2-oxetanone); copolyesters of an aliphatic polyester and an aromatic polyester, such as polybutylene succinate/terephthalate, polybutylene adipate/terephthalate, and polytetramethylene adipate/terephthalate; mixtures of a natural polymer, such as starch, cellulose, chitin, chitosan, gluten, gelatin, zein, soybean protein, collagen, or keratin, with the aliphatic polyester or the copolyester of an aliphatic polyester and an aromatic polyester mentioned above; and the like. Among them, the polylactic acid resin is preferred, from the viewpoint of processability, economic advantages, availability, and physical properties. Here, the term "biodegradable or biodegradability" as used herein refers to a property capable of being degraded to low molecular compounds by microorganisms in nature. Specifically, the term means biodegradability based on "test on aerobic and ultimate biodegradation degree and disintegration degree under controlled aerobic compost conditions" of JIS K6953 (ISO 14855).

The polylactic acid resin contains a polylactic acid obtained by polycondensing lactic acid components alone as raw material monomers, and/or a polylactic acid obtained by polycondensing a lactic acid component and a hydroxycarboxylic acid component (hereinafter simply referred to as a hydroxycarboxylic acid component) other than lactic acid as raw material monomers.

Lactic acids exist in the form of optical isomers, L-lactic acid (L-form) and D-lactic acid (D-form). In the present invention, the lactic acid component may contain either one of the optical isomers or both, and it is preferable to use a lactic acid having high optical purity, which contains either one of the optical isomers as a main component, from the viewpoint of moldability of the biodegradable resin composition. The term "main component" as used herein refers to a component that is contained in an amount of 50% by mol or more of the lactic acid component.

On the other hand, the hydroxycarboxylic acid component includes hydroxycarboxylic acid compounds such as glycolic acid, hydroxybutyric acid, hydroxyvaleric acid, hydroxypentanoic acid, and hydroxycaproic acid, which can be used alone or in a combination of two or more kinds. Among them, glycolic acid and hydroxycaproic acid are preferred, from the viewpoint of heat resistance and transparency of the biodegradable resin composition.

In addition, in the present invention, each of the lactic acid dimer and the dimer of the hydroxycarboxylic acid compound mentioned above may be contained in the respective component. Preferred examples include D-lactide and L-lactide, from the viewpoint of heat resistance and transparency of the biodegradable resin composition. Here, the lactic acid dimer may be contained in the lactic acid component in either one of the embodiment where the lactic acid components alone are polycondensed, or the embodiment where the lactic acid component and the hydroxycarboxylic acid component are polycondensed.

The lactic acid dimer is contained in an amount of preferably from 80 to 100% by mol, and more preferably from 90 to 100% by mol, of the lactic acid component, from the viewpoint of heat resistance of the biodegradable resin composition.

The dimer of the hydroxycarboxylic acid compound is contained in an amount of preferably from 80 to 100% by mol, and more preferably from 90 to 100% by mol, of the hydroxycarboxylic acid component, from the viewpoint of heat resistance of the biodegradable resin composition.

The polycondensation reaction of the lactic acid components alone, and the polycondensation reaction of the lactic acid component and the hydroxycarboxylic acid component can be carried out, but not particularly limited to, using known methods.

The raw material monomers are thus selected, whereby a polylactic acid, for example, made of either component of L-lactic acid or D-lactic acid in an amount of 85% by mol or more and less than 100% by mol, and a hydroxycarboxylic acid component in an amount exceeding 0% by mol and 15% by mol or less, is obtained. Among them, a polylactic acid obtained by using a lactide, which is a cyclic lactic acid dimer, and a glycolide, which is a cyclic glycolic acid dimer, and caprolactone as raw material monomers is preferred. Here, the polylactic acid has an optical purity of preferably 95% or more, and more preferably 98% or more, from the viewpoint of heat resistance and transparency of the biodegradable resin composition. The optical purity of a polylactic acid resin as used herein can be obtained in accordance with the measurement method for D-form content described in "*Poriorefin-toh Gosei-jushi-sei Shokuhin Youki Houso-toh ni Kansuru Jishukijun* (*Self-Standards Concerning Food Containers and Wrappings Made of Synthetic Resins Such as Polyolefins*)," Revised Third Edition, supplemented in June, 2004, Chapter 3 Eisei Shikenho (Hygienic Test Method), p. 12-13." Specifically, the optical purity is measured by a method described in Examples set forth below.

In addition, in the present invention, as the polylactic acid, a stereocomplex polylactic acid, composed of two kinds of polylactic acids, each obtained from a lactic acid component containing an isomer different from one another as a main component, may be used, from the viewpoint of heat resistance and transparency of the biodegradable resin composition.

One polylactic acid constituting the stereocomplex polylactic acid [hereinafter referred to as "polylactic acid (A)"] contains the L-form in an amount of from 90 to 100% by mol, and other component including the D-form in an amount of from 0 to 10% by mol. The other polylactic acid [hereinafter referred to as "polylactic acid (B)"] contains the D-form in an amount of from 90 to 100% by mol, and other component including the L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

The melting point (Tm)(° C.) of the polylactic acid is preferably from 140° to 250° C., more preferably from 150° to 240° C., and even more preferably from 160° to 230° C., from the viewpoint of dispersibility of the plasticizer and the crystal nucleating agent, or the like, and from the viewpoint of bending strength, degradation, and productivity of the resin composition. Here, the melting point of the resin as used herein is measured in accordance with the method described in Examples set forth below.

The polylactic acid is contained in the polylactic acid resin in an amount of preferably 80% by weight or more, more preferably 90% by weight or more, and even more preferably substantially 100% by weight.

In addition, the polylactic acid resin is contained in the biodegradable resin composition in, but not particularly limited to, an amount of preferably 50% by weight or more, more preferably 60% by weight or more, and even more preferably 70% by weight or more.

Here, the polylactic acid resin can be synthesized according to the above method, and commercially available products include, for example, "LACEA Series" (manufactured by Mitsui Chemicals, Inc.), such as LACEA H-100, H-280, H-400, and H-440; "Nature Works" (manufactured by Nature Works), such as 3001D, 3051D, 4032D, 4042D, 6201D, 6251D, 7000D, and 7032D; and "Ecoplastic U'z Series" (manufactured by TOYOTA MOTOR CORPORATION), such as Ecoplastic U'z S-09, S-12, and S-17. Among them, LACEA H-100, H-280, H-400, H-440 (manufactured by Mitsui Chemicals, Inc.), 3001D, 3051D, 4032D, 4042D, 6201D, 6251D, 7000D, and 7032D (manufactured by Nature Works), and Ecoplastic U'z S-09, S-12, and S-17 (manufactured by TOYOTA MOTOR CORPORATION) are preferred, from the viewpoint of heat resistance of the biodegradable resin composition.

In the present invention, as the raw material for the biodegradable resin composition, in addition to the ethylenebis 12-hydroxystearic amide and the biodegradable resin mentioned above, it is preferable to contain a plasticizer, which is an ester compound having two or more esters in one molecule, wherein at least one member of the alcohol component constituting the ester compound is an alcohol to which an alkylene oxide having 2 or 3 carbon atoms is added in an amount of from 0.5 to 5 mol on average per one hydroxyl group.

<Plasticizer>

The plasticizer in the present invention includes an ester compound having two or more esters in one molecule, wherein at least one member of the alcohol component constituting the ester compound is an alcohol to which an alkylene oxide having 2 or 3 carbon atoms is added in an amount of from 0.5 to 5 mol on average per one hydroxyl group. Specifically, the plasticizer is exemplified by plasticizers listed in Japanese Patent Laid-Open Nos. 2008-174718 and 2008-115372. Among them, an ester compound having two or more esters in one molecule, wherein at least one member of the alcohol component constituting the ester compound is an alcohol to which an alkylene oxide having 2 or 3 carbon atoms is added in an amount of from 0.5 to 5 mol on average per one hydroxyl group is preferred, and an ester of a polyhydric alcohol, a polycarboxylic acid ether ester or a polyester formed between a dicarboxylic acid and a diol, wherein at least one member of the alcohol component constituting the ester compound is an alcohol to which ethylene oxide is added in an amount of from 0.5 to 5 mol on average per one hydroxyl group is more preferred.

As the plasticizer having the structure mentioned above, a compound having two or more ester groups in one molecule, and the number of moles of ethylene oxide added of from 3 to 9 mol is preferred, at least one member selected from an ester formed between succinic acid or adipic acid and polyethylene glycol monomethyl ether, and an ester formed between acetic acid and an ethylene oxide adduct of glycerol or ethylene glycol is more preferred, and an ester formed between succinic acid or adipic acid and polyethylene glycol monomethyl ether is even more preferred, from the viewpoint of moldability, plasticizing ability, and bleeding resistance.

As the plasticizer having the structure mentioned above, an ester formed between a polycarboxylic acid and a polyethylene glycol monomethyl ether, such as an ester formed between acetic acid and an adduct of ethylene oxide having an average number of moles added of 3 to 9 of glycerol, an ester formed between succinic acid and a polyethylene glycol monomethyl ether of which ethylene oxide moiety has an average number of moles added of from 2 to 4, and an ester formed between adipic acid and a polyethylene glycol monomethyl ether having an average number of moles added of from 2 to 3, are preferred, from the viewpoint of excellent moldability of the biodegradable resin composition. An ester formed between succinic acid and a polyethylene glycol monomethyl ether of which ethylene oxide moiety has an average number of moles added of from 2 to 3, and an ester formed between adipic acid and a diethylene glycol monomethyl ether are more preferred, from the viewpoint of excellent moldability of the biodegradable resin composition, and excellent bleeding resistance of the plasticizer. An ester formed between succinic acid and a triethylene glycol monomethyl ether is even more preferred, from the viewpoint of moldability of the biodegradable resin composition, and bleeding resistance, volatile resistance, and irritable odor resistance of the plasticizer.

Also, the plasticizer usable in the present invention may contain an ester compound in which the number exceeding 0 and 1.5 or less on average of the ester group out of the two or more ester groups is constituted by an aromatic alcohol, from the viewpoint of volatile resistance, and a diester formed between an adipic acid and a 1/1 mixture of diethylene glycol monomethyl ether/benzyl alcohol is preferred.

The plasticizer has an average molecular weight of preferably from 250 to 700, more preferably from 300 to 600, even more preferably from 350 to 550, and even more preferably from 400 to 500, from the viewpoint of bleeding resistance and volatility-resistance. Here, the average molecular weight can be obtained by obtaining a saponification value in accordance with a method prescribed in JIS K0070, and calculating the average molecular weight according to the following formula:

$$\text{Average Molecular Weight} = 56{,}108 \times \frac{\text{Number of Ester Groups}}{\text{Saponification Value}}$$

Here, it is preferable that the above-mentioned ester is a saturated ester where all the groups are esterified, from the viewpoint of sufficiently exhibiting its function as a plasticizer.

The plasticizer in the biodegradable resin composition according to the present invention is contained in an amount of preferably from 5 to 30 parts by weight, more preferably from 7 to 30 parts by weight, and even more preferably from 10 to 30 parts by weight, based on 100 parts by weight of the biodegradable resin, from the viewpoint of obtaining sufficient crystallization velocity.

The raw material in the present invention may contain, in addition to those mentioned above, an additive such as a filler, a hydrolysis inhibitor, or a flame retardant.

The filler is preferably blended from the viewpoint of obtaining a biodegradable resin composition excellent in such properties as mechanical properties, moldability and heat resistance, and the filler in the form of fibers, plates, granules, or powders, that are ordinarily usable as a filler for the thermoplastic resin composition, can be used. Specifically, the filler includes silicates, such as talc, smectite, kaolin, mica, and montmorillonite; inorganic compounds, such as silica, magnesium oxide, titanium oxide, and calcium carbonate; fibrous inorganic fillers such as glass fiber, carbon fiber, graphite fiber, wollastonite, potassium titanate whisker, and silicon-containing whisker, organic fillers such as nylon fiber and acrylic fiber; and the like.

[Inorganic Filler]

As the inorganic filler, fibrous, plate-like, granular or powdery forms that are ordinarily used in reinforcement of a thermoplastic resin can be used. Specific examples thereof include fibrous inorganic fillers, such as glass fiber, asbestos fiber, carbon fiber, graphite fiber, metal fiber, potassium titanate whisker, aluminum borate whisker, magnesium-containing whisker, silicon-containing whisker, wollastonite, sepiolite, asbestos, slag fiber, gypsum fiber, silica fiber, silica alumina fiber, zirconia fiber, boron nitride fiber, silicon nitride fiber, and boron fiber; and plate-like or granular inorganic fillers, such as glass flake, graphite, metal foil, ceramic beads, talc, clay, mica, sericite, zeolite, bentonite, dolomite, kaolin, fine silicic acid powder, feldspar powder, potassium titanate, calcium carbonate, magnesium carbonate, barium sulfate, calcium oxide, aluminum oxide, titanium oxide, aluminum silicate, silicon oxide, gypsum, and white clay. Among these inorganic fillers, carbon fiber, glass fiber, wollastonite, mica, talc, and kaolin are preferred. In addition, the fibrous filler has an aspect ratio of preferably 5 or more, more preferably 10 or more, and even more preferably 20 or more.

The above-mentioned inorganic filler may be subjected to a coating or binding treatment with a thermoplastic resin such as an ethylene/vinyl acetate copolymer, or with a thermosetting resin such as an epoxy resin, and the inorganic filler may be treated with a coupling agent such as amino silane or epoxy silane.

[Organic Filler]

As the organic filler, chip-like, fibrous, plate-like or powdery forms that are ordinarily used in reinforcement of a thermoplastic resin can be used. Specific examples thereof include those having a chip-form, such as husks, wood chips, bean-curd wastes, wastepaper-crushed material, and clothing crushed material; those having fibrous forms, such as plant fibers such as cotton fiber, flax fiber, bamboo fiber, wood fiber, kenaf fiber, jute fiber, banana fiber, or coconut fiber, or pulps or cellulose fiber processed from these plant fibers, and animal fibers such as silk, wool, angora, cashmere, or camel; those having powdery form such as pulp powder, paper powder, wood powder, bamboo powder, cellulose powder, hulk powder, fruit shell powder, chitin powder, chitosan powder, protein, or starch. Those having a powdery form, such as paper powder, wood powder, bamboo powder, cellulose powder, kenaf powder, hulk powder, fruit shell powder, chitin powder, chitosan powder, protein powder, or starch powder are preferred, and paper powder, wood powder, bamboo powder, cellulose powder, and kenaf powder are more preferred, from the viewpoint of moldability. In addition, it is preferable to use an organic filler in the form of a powder in which a cellulose is amorphized with a vibrating rod mill, a beads-mill or the like, from the viewpoint of improving toughness. Specifically, it is preferable that the organic fiber is an amorphized cellulose described in WO 2010/010961.

The filler is contained in an amount of preferably from 1 to 300 parts by weight, and more preferably from 5 to 150 parts by weight, based on 100 parts by weight of the biodegradable resin, from the viewpoint of obtaining sufficient heat resistance and impact resistance.

The hydrolysis inhibitor includes carbodiimide compounds, such as polycarbodiimide compounds and monocarbodiimide compounds. The monocarbodiimide compounds are preferred, from the viewpoint of moldability of the biodegradable resin composition, and the polycarbodiimide compounds are preferred, from the viewpoint of heat resistance and impact resistance of the biodegradable resin composition, and bleeding resistance of the crystal nucleating agent.

The polycarbodiimide compound includes poly(4,4'-diphenylmethanecarbodiimide), poly(4,4'-dicyclohexylmethanecarbodiimide), poly(1,3,5-triisopropylbenzene) polycarbodiimide, poly(1,3,5-triisopropylbenzene and 1,5-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the biodegradable resin composition, the above carbodiimide compounds may be used alone or in a combination of two or more kinds. In addition, as the poly(4,4'-dicyclohexylmethanecarbodiimide), Carbodilite LA-1 (manufactured by Nisshin Boseki) can be purchased and used; as the poly(1,3,5-triisopropylbenzene)polycarbodiimide and poly(1,3,5-triisopropylbenzene and 1,5-diisopropylbenzene)polycarbodiimide, Stabaxol P and Stabaxol P-100 (manufactured by Rhein Chemie) can be purchased and used; and as N,N'-di-2,6-diisopropylphenylcarbodiimide, Stabaxol ILF (manufactured by Rhein Chemie) can be purchased and used.

The hydrolysis inhibitor is contained in an amount of preferably from 0.05 to 15 parts by weight, more preferably from 0.10 to 10 parts by weight, and even more preferably from 0.20 to 10 parts by weight, based on 100 parts by weight of the biodegradable resin, from the viewpoint of hydrolysis inhibition of the biodegradable resin.

Specific examples of the flame retardant include halogen-containing compounds, containing bromine or chlorine, such as tetrabromobisphenol-A-epoxy oligomer, tetrabromobisphenol-A-carbonate oligomer, and brominated epoxy resin; inorganic flame retardants such as antimony trioxide and zinc borate; silicone-based flame retardants such as silicone resins and silicone oil; inorganic hydrates such as aluminum hydroxide and magnesium hydroxide (preferably surface-treated with a silane coupling agent, especially isocyanate silane, from the viewpoint of physical properties); phosphorus-containing flame retardants such as triarylisopropyl phosphate, condensed phosphoric ester, melamine polyphosphoric acid, piperazine polyphosphoric acid, and phosphazene compounds; and nitrogen-containing flame retardants such as melamine cyanurate; and the like.

As the flame retardant, a phosphorus-containing flame retardant is preferred, from the viewpoint of improving flame retardancy of the biodegradable resin composition, and at least one member selected from condensed phosphoric esters, phosphoric acid salts, and condensed phosphoric acid salts is preferred. In addition, an inorganic hydrate or a phosphorus-containing flame retardant is preferred, from the viewpoint of safety, and a combined use of an inorganic hydrate and a phosphorus-containing compound is preferred, from the viewpoint of physical properties. The flame retardant is contained in an amount of preferably from 10 to 60 parts by weight, and more preferably from 15 to 55 parts by weight, based on 100 parts by weight of the biodegradable resin.

The biodegradable resin composition of the present invention can contain a high-strength organic synthesis fiber, from the viewpoint of improving strength, heat resistance, impact resistance, and the like. Specific examples of the high-strength organic synthesis fiber include aramide fiber, polyarylate fiber, PBO fiber and the like, and aramide fiber is preferred, from the viewpoint of heat resistance. The high-strength organic synthesis fiber is contained in an amount of preferably from 3 to 20 parts by weight, and more preferably from 5 to 10 parts by weight, based on 100 parts by weight of the biodegradable resin.

The biodegradable resin composition of the present invention may contain other resins from the viewpoint of improving physical properties such as rigidity, flexibility, heat resistance, and durability. Specific examples of other resins include thermoplastic resins such as polyethylene, polypropylene, polystyrene, ABS resins, AS resins, acrylic resins, polyamides, polyphenylene sulfide, polyether ether ketone, polyesters, polyacetals, polysulfone, polyphenylene oxide, polyimide, polyetherimide, and the like, or flexible thermoplastic resins such as ethylene/glycidyl methacrylate copolymers, polyester elastomers, polyamide elastomers, ethylene/propylene terpolymers, ethylene/buten-1-e copolymers; thermosetting resins, such as phenol resins, melamine resins, unsaturated polyester resins, silicone resins, and epoxy resins; and the like. Among them, it is preferable that a resin has a bond containing a carbonyl group, such as amide bond, an ester bond, or carbonate bond, because the resin is likely to have a structurally high affinity with a biodegradable resin, especially with a polylactic acid, from the viewpoint of compatibility with the biodegradable resin.

The biodegradable resin composition of the present invention may contain a core-shell shaped rubber, from the viewpoint of improving physical properties such as impact resistance and toughness. Specific examples thereof include (core: silicone/acrylic polymer, shell: methyl methacrylate polymer), (core: silicone/acrylic polymer, shell: methyl methacrylate/glycidyl methacrylate polymer), (core: butadiene/styrene polymer, shell: methyl methacrylate polymer), (core: acrylic polymer, shell: methyl methacrylate polymer), and the like. As a commercially available product, METABLEN S-2006, S-2100, S-2200, manufactured by Mitsubishi Rayon, PARALOID BPM-500, manufactured by Rohm and Haas are preferred, from the viewpoint of transparency. The core-shell shaped rubber is contained in an amount of preferably from 2 to 30 parts by weight, more preferably from 3 to 20 parts by weight, based on 100 parts by weight of the biodegradable resin.

The biodegradable resin composition of the present invention can further contain, in addition to those mentioned above, a hindered phenol or a phosphite-based antioxidant, or a lubricant such as an aliphatic amide, a metal salt of a fatty acid, a hydrocarbon-based wax or an anionic surfactant. Each of the antioxidant or lubricant is contained in an amount of preferably from 0.05 to 3 parts by weight, and more preferably from 0.10 to 2 parts by weight, based on 100 parts by weight of a biodegradable resin.

In addition, in the present invention, an additive such as a stabilizer (ultraviolet absorbent, photostabilizer, or the like), a mold releasing agent, a colorant including a dye and a pigment, an antistatic agent, an anti-clouding agent, a mildewproof agent, a bactericidal agent, or a blowing agent may be blended as a raw material for the composition within the range that would not impair the achievement of the purpose of the present invention.

The melt-kneading of a raw material is not particularly limited, and the melt-kneading can be carried out using a known kneader such as a closed kneader, a single-screw or twin-screw extruder, or an open roller-type kneader. Here, it is preferable that the raw material is previously homogeneously mixed with a Henschel mixer, Super mixer, or the like, and then subjected to melt-kneading.

The melt-kneading temperature is equal to or higher than a melting point (Tm) of the biodegradable resin, preferably a temperature calculated in the range of from Tm to Tm+100° C., and more preferably a temperature calculated in the range of from Tm+50° C., from the viewpoint of dispersibility of the plasticizer, the crystal nucleating agent, and the like. For example, the melt-kneading temperature is preferably from 170° to 240° C., and more preferably from 170° to 220° C. The melt-kneading time cannot be unconditionally determined because it depends on a melt-kneading temperature and a kind of a kneader, and the melt-kneading time is preferably from 15 to 900 s.

In addition, the present invention may include the step of cooling a melt-kneaded product after the melt-kneading step (hereinafter also referred to as a cooling step), from the viewpoint of even more improving crystallization velocity of a melt-kneaded product obtained by the melt-kneading step mentioned above. A cooling temperature is a temperature that is calculated from a melt-kneading temperature minus 60° C. or more, and more preferably that minus 70° C. or more, and specifically, a cooling temperature is preferably from 20° to 120° C., and more preferably from 20 to 100° C. The cooling time is preferably from 2 to 90 s, and more preferably from 5 to 60 s. Here, upon the cooling step, cooling may be carried out after molding a melt-kneaded mixture in accordance with a known method.

Furthermore, after cooling, there may be included a step of keeping the cooled product at a temperature of preferably from 50° to 120° C., and more preferably from 60° to 100° C., and for a period of preferably from 30 to 180 s, more preferably from 30 to 120 s, and even more preferably from 30 to 60 s (hereinafter also referred to a keeping step). Here, a temperature at the keeping step may be the same or different from the temperature at cooling step.

Thus, a biodegradable resin composition of which crystallization is promoted is obtained, which is a melt-kneaded product of a raw material containing a crystal nucleating agent ethylenebis 12-hydroxystearic amide and a biodegradable resin. Therefore, the present invention provides a biodegradable resin composition of which crystallization is promoted according to a method for promoting crystallization of the present invention. Here, the phrase "(of which) crystallization is promoted" means a state in which "a crystallization velocity is improved," or "crystallization is more easily proceeded."

A specific method for crystallization includes a melt crystallization method including the steps of cooling a biodegradable resin composition from a molten state in the same manner to a die temperature as in injection molding, and further keeping in a die to allow crystallization; and a cold crystallization method including step of heating a biodegradable resin composition in an amorphized state at a temperature equal to or lower than its glass transition temperature to allow crystallization. Since the biodegradable resin composition of the present invention has excellent crystallization velocity, in a case where a biodegradable resin composition contains a plasticizer, a semi-crystallization time at 100° C. in a melt crystallization method is preferably 30 s or less, more preferably 27 s or less, and even more preferably 24 s or less. Here, a semi-crystallization time (melt crystallization) at 100° C. can be obtained by a method shown in Examples. In addition, the biodegradable resin composition of the present invention has an excellent crystallization velocity, in a case where a biodegradable resin composition contains a plasticizer, a semi-crystallization time at 80° C. in a cold crystallization method (vacuum molding method) is preferably 24 s or less, more preferably 21 s or less, and even more preferably 18 s or less. Here, the semi-crystallization time at 80° C. (cold crystallization) can be obtained by a method shown in Examples.

Since the biodegradable resin composition of the present invention has excellent color, high crystallization velocity, and excellent moldability, the biodegradable resin composition can be worked at a low temperature of 200° C. or lower, so that the biodegradable resin composition can be molded into films and sheets, to be used in various applications.

The present invention also provides a method for producing a biodegradable resin composition of the present invention.

The method for production of the present invention is a method including the step of melt-kneading a raw material containing an ethylenebis 12-hydroxystearic amide having an amine value of 1.0 mgKOH/g or less, and a biodegradable resin, and the production conditions and the like are as mentioned above.

Furthermore, the present invention provides a biodegradable resin molded article formed by molding the biodegradable resin composition of the present invention.

The biodegradable resin molded article of the present invention may be any of those formed by molding a biodegradable resin composition of the present invention. Specifically, the resin molded article can be prepared by filling a melt-kneaded product which is obtained according to a method for promoting crystallization of a biodegradable resin composition of the present invention in a die using an injection molding machine or the like to mold.

The die temperature is preferably from 20° to 120° C., more preferably from 20° to 100° C., and even more preferably from 20° to 80° C., from the viewpoint of improving crystallization velocity and improving operability.

The time period to be kept within a die is preferably within 90 s, more preferably within 60 s, and even more preferably within 30 s, from the viewpoint of improving productivity.

In addition, the biodegradable resin molded article of the present invention may be any of those formed by molding a biodegradable resin composition of the present invention into a sheet-like form. As a method of molding to a sheet-like form, a method described in Japanese Patent Laid-Open Nos. 2007-152760, 2007-130893, or 2007-130895 can be utilized.

The biodegradable resin molded article of the present invention is prepared by molding a biodegradable resin composition of the present invention of which crystallization is promoted, and a crystal nucleating agent of which amine value is reduced is used, so that formation of a resin degradation product in the molded article is inhibited, whereby making mold releasing property from the die of the molded article obtained excellent.

EXAMPLES

The following examples further describe and demonstrate embodiments of the present invention. The examples are given solely for the purposes of illustration and are not to be construed as limitations of the present invention. Here, parts in Examples refer to parts by weight unless specified otherwise.

[Weight-Average Molecular Weights (Mw) of Polylactic Acid Resins]

The weight-average molecular weight (Mw) is measured in accordance with GPC (Gel Permeation Chromatography) under the following measurement conditions.

<Measurement Conditions>
Column: GMHHR-H+GMHHR-H
Column Temperature: 40° C.
Detector: RI
Eluent: Chloroform
Flow Rate: 1.0 mL/min
Concentration of Sample: 1 mg/mL
Amount Injected: 0.1 mL
Conversion Standard: Polystyrene

[Optical Purity of Polylactic Acid Resin]

The optical purity of a polylactic acid resin is measured in accordance with the measurement method for D-form content described in "*Poriorefin-toh Gosei-jushi-sei Shokuhin Youki Houso*-toh ni Kansuru *Jishukijun (Self-Standards Concerning Food Containers and Wrappings Made of Synthetic Resins Such as Polyolefins)*," Revised Third Edition, supplemented in June, 2004, Chapter 3 Eisei Shikenho (Hygienic Test Method), p. 12-13" under the following measurement conditions. Specifically, sodium hydroxide in methanol is added to an accurately weighed polylactic acid, and a mixture is set in a water bath shaking machine set at 65° C., and allowed to be hydrolyzed until the resinous components are formed into a homogeneous solution. Further, a diluted hydrochloric acid is added to an alkaline solution after hydrolysis is completed to neutralize, and the hydrolyzed solution is diluted to a certain volume with pure water. Thereafter; a given volume of the dilution is separated in a volumetric flask, and the separated solution is diluted with a mobile phase solution for high-performance liquid chromatography (HPLC). The pH of the dilution is adjusted to a range of from 3 to 7, and the dilution in the volumetric flask is quantified, and filtered with a membrane filter (0.45 μm). The resulting prepared solution is quantified for D-lactic acid and L-lactic acid in accordance with HPLC under the measurement conditions shown below, whereby optical purity of the polylactic acid resin can be obtained.

<Measurement Conditions for HPLC>
Column: Optically Resolution Column
SUMICHIRAL OA6100 (46 mmφ×150 mm, 5 μm), manufactured by Sumika Chemical Analysis Service, Ltd.

Pre-Column: Optically Resolution Column
SUMICHIRAL QA6100 (4 mmφ×10 mm, 5 μm), manufactured by Sumika Chemical Analysis Service, Ltd.
Column Temperature: 25° C.
Mobile Phase: 2.5% Methanol-containing 1.5 mM aqueous copper sulfate solution
Flow Rate of Mobile Phase: 1.0 mL/minute
Detector: Ultraviolet Detector (UV 254 nm)
Amount of Injection: 20 μL

[Melting Points of Polylactic Acid Resins]

The melting points of the polylactic resins are obtained from an endothermic peak temperature of melt crystallization according to a heating method for measuring differential scanning calorimetry as prescribed in JIS-K7121 (DSC; Diamond DSC, manufactured by Perkin-Elmer). The melting point is measured by heating from 20° to 250° C. at a heating rate of 10° C./minute.

<Production Example 1 of Plasticizer> (Diester Formed Between Succinic Acid and Triethylene Glycol Monomethyl Ether)

A 3 L flask equipped with a stirrer, a thermometer, and a dehydration tube was charged with 500 g of succinic anhydride, 2463 g of triethylene glycol monomethyl ether, and 9.5 g of paratoluenesulfonic acid monohydrate, and the components were reacted at 110° C. for 15 hours under a reduced pressure (4 to 10.7 kPa), while blowing nitrogen (500 mL/minute) into a space portion. The reaction mixture had an acid value of 1.6 (KOH mg/g). Twenty-seven grams of an adsorbent KYOWAAD 500SH (manufactured by Kyowa Kagaku Kogyo) was added to the reaction mixture, and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and cooled to 80° C., and the residue was filtered under a reduced pressure, to provide a diester formed between succinic acid and triethylene glycol monomethyl ether as a filtrate. The resulting diester had an acid value of 0.2 (KOH mg/g), a saponification value of 276 (KOH mg/g), a hydroxyl value of 1 or less (KOH mg/g), and a color APHA of 200.

<Production Example 2 of Plasticizer> (Triester Formed Between Acetic Acid and Ethylene Oxide Adduct in which 6 mol of Ethylene Oxide is Added to Glycerol)

An autoclave was charged with defined amounts of materials in a molar ratio of 6 mol of ethylene oxide per 1 mol of concentrated glycerol for cosmetics manufactured by Kao Corporation, and a reaction was carried out at 150° C. using a 1% by mol KOH as a catalyst with applying a given pressure of a reaction pressure of 0.3 MPa until the pressure was at a constant level, and the reaction mixture was then cooled to 80° C. to provide a reaction mixture containing a non-neutralized catalyst. KYOWAAD 600S (manufactured by Kyowa Kagaku Kogyo) was added as an adsorbent of the catalyst to the reaction mixture in an amount 8 times the weight of the catalyst, and subjected to an adsorption treatment at 80° C. for 1 hour in the presence of nitrogen. Further, a liquid mixture after the treatment was filtered with a Büchner funnel (Nutsche) in which a filter paper No. 2 was precoated with Radiolite #900 to remove the adsorbent to provide an ethylene oxide (6 mol) adduct of glycerol (hereinafter referred to as POE(6) glycerol). A four-necked flask was charged with this ethylene oxide adduct of glycerol, the contents were heated to 105° C. while stirring at 300 r/min, and acetic anhydride was added dropwise in a defined amount for about 1 hour, in a ratio of 7.2 mol per mol of the POE(6) glycerol to react. After the dropwise addition, the reaction mixture was aged at 110° C. for 2 hours, and further aged at 120° C. for 1 hour. After aging, unreacted acetic anhydride and a by-product acetic acid were subjected to topping under a reduced pressure, and a treated mixture was further steamed, to provide POE(6) glycerol triacetate. The resulting POE(6) glycerol triacetate had an average molecular weight of 490.

<Purification Example 1 of Crystal Nucleating Agent>
(Purification of Ethylenebis 12-Hydroxystearic Amide; Crystallization Method)

A 1-L cylindrical separable flask equipped with an anchor-shaped stirrer and a thermometer was charged with 13 g of an unpurified ethylenebis 12-hydroxystearic amide (SLIPAX H, manufactured by Nippon Kasei Chemical Co., Ltd.) (unpurified product), and 130 g of 1-butanol (1,000 parts by weight based on 100 parts by weight of unpurified ethylenebis 12-hydroxystearic amide), and the contents were heated while stirring at 90° C. for 1 hour at 100 r/min. Thereafter, the contents were cooled to 25° C. over a period of 3 hours, and further stirred at 25° C. for 1 hour, and the slurry obtained was filtered with a pressure filter set with a membrane filter having a pore size of 1 micron (material: PTFE, manufactured by ADVANTEC) at a pressure of 0.2 MPa. The residue obtained was subjected to cake-washing twice, using 39 g of 1-butanol (25° C.) (100 parts by weight based on 100 parts by weight of the residue) for each washing, and the washed residue was dried in vacuo (133 Pa) at 60° C. for 12 hours, to provide a purified ethylenebis 12-hydroxystearic amide (purified product (1)). The quality of the unpurified product and the purified product (1) was evaluated in accordance with the following method. The results are shown in Table 1.

<Purification Example 2 of Crystal Nucleating Agent>
(Purification of Ethylenebis 12-hydroxystearic Amide; Thermal Washing Method)

A 3-L cylindrical separable flask equipped with an anchor-shaped stirrer and a thermometer was charged with 400 g of an unpurified ethylenebis 12-hydroxystearic amide (SLIPAX H, manufactured by Nippon Kasei Chemical Co., Ltd.) used in Purification Example 1, and 2,000 g of methanol, and the contents were heated while stirring at 60° C. for 1 hour at 100 r/min. The contents were cooled to 25° C. over a period of 0.5 hours, and thereafter the slurry was transferred to a pressure filter set with a membrane filter having a pore size of 1 micron (material: PTFE, manufactured by ADVANTEC), and filtered at a pressure of 0.1 MPa. The residue obtained was subjected to cake-washing three times, using 280 g of methanol (25° C.) for each washing, and the washed residue was dried in vacuo (4 kPa) at 60° C. for 6 hours, to provide a purified ethylenebis 12-hydroxystearic amide (purified product (2)). The quality of the purified product (2) was evaluated in accordance with the following method. The results are shown in Table 1.

<Purification Example 3 of Crystal Nucleating Agent>
(Purification of Ethylenebis 12-hydroxystearic Amide; Combined Use of Crystallization Method and Thermal Washing Method)

A 1-L cylindrical separable flask equipped with an anchor-shaped stirrer and a thermometer was charged with 50 g of a purified ethylenebis 12-hydroxystearic amide obtained in Purification Example 1 and 500 g of 1-butanol, and the contents were heated while stirring at 90° C. for 30 minutes at 100 r/min. Thereafter, the contents were cooled to 25° C. over a period of 2 hours, and the slurry was transferred to a pressure filter set with a membrane filter having a pore size of 1 micron (material: PTFE, manufactured by ADVANTEC), and filtered at a pressure of 0.1 MPa. The same procedures were repeated using the residue obtained. Next, this residue was once again returned to the cylindrical separable flask, the flask was then charged with 300 g of methanol, and the contents were heated while stirring at 60° C. for 30 minutes at 100 r/min. The contents were cooled to 25° C. over a period of 0.5 hours, and thereafter the slurry was filtered in accordance with the same procedures. The residue obtained was returned again to the cylindrical separable flask, and the flask was charged with 300 g of methanol, and the same procedures were repeated to provide a filtration cake. The cake obtained was dried in vacuo (1 kPa) at 70° C. for 2 hours, to provide a purified ethylenebis 12-hydroxystearic amide (purified product (3)). The quality of the purified product (3) was evaluated in accordance with the following method. The results are shown in Table 1.

<Total Amine Value>

The measurement is taken in accordance with ASTM D 2074.

<Acid Value>

The measurement is taken in accordance with JIS K 0070.

<Color>

The measurement is taken in accordance with JIS K 0071-2.

<Solidification Point>

A 7.5 mg sample was accurately weighed, and sealed inside an aluminum pan, and the sample was melted at 200° C. for 2 minutes using a DSC apparatus (Diamond DSC, manufactured by Perkin-Elmer), and cooled to 25° C. at a rate of 10° C./minute to obtain a temperature of exothermic peak.

TABLE 1

|  | Unpurified Product | Purified Product (1) | Purified Product (2) | Purified Product (3) |
|---|---|---|---|---|
| Total Amine Value (mgKOH/g) | 4.7 | 0.19 | 0.32 | 0.040 |
| Acid Value (mgKOH/g) | 4.1 | 0.23 | 0.19 | 0.03 |
| Color (Gardner) | 5 | 1 | 4 | <1 |
| Solidification Point (° C.) | 134.0 | 140.5 | 136.2 | 141.6 |

<Production Examples of Crystal Nucleating Agents>
(Crystal Nucleating Agents A to G)

The purified products (1) to (3) of ethylenebis 12-hydroxystearic amide, and the unpurified product listed in Table 1, or 12-hydroxystearic acid (manufactured by Itoh Seiyu, acid value: 181 mgKOH/g) were used, and blended in a proportion as listed in Table 2, and then mixed with a mortar for 10 minutes, to provide each of the crystal nucleating agents A to G. The quality was evaluated in the same manner as that for the purified product (1). The results are shown in Table 2.

TABLE 2

|  | Crystal Nucleating Agent A | Crystal Nucleating Agent B | Crystal Nucleating Agent C | Crystal Nucleating Agent D | Crystal Nucleating Agent E | Crystal Nucleating Agent F | Crystal Nucleating Agent G |
|---|---|---|---|---|---|---|---|
| Purified Product (1) | 100 | 93 | 82 | — | — | 80 | — |
| Purified Product (2) | — | — | — | — | 100 | — | — |
| Purified Product (3) | — | — | — | 100 | — | — | — |
| Unpurified Product | — | 7 | 18 | — | — | 20 | 100 |
| 12-Hydroxystearic Acid | — | — | — | — | — | 1.4 | — |
| Total Amine Value (mgKOH/g) | 0.19 | 0.51 | 1.0 | 0.040 | 0.32 | 1.1 | 4.7 |
| Acid Value (mgKOH/g) | 0.23 | 0.50 | 0.93 | 0.03 | 0.19 | 3.5 | 4.1 |
| Color (Gardner) | 1 | 1 | 2 | <1 | 4 | 3 | 5 |
| Solidification Point (° C.) | 140.5 | 140.1 | 139.3 | 141.6 | 136.2 | 136.5 | 134.0 |

Examples 1 to 9 and Comparative Examples 1 to 6

As a polylactic resin composition, raw materials for a composition listed in Table 3 or 4 were kneaded with a kneader at 180° C. (manufactured by Toyo Seiki, Labo-plastomill) for 10 minutes, and molded into a sheet-like form having a thickness of 0.3 mm with a press-molding machine at 190° C., and the molded product was cooled to 25° C. and kept as it is for 60 seconds, and then further kept at 90° C. for 1 minute to provide a sheet (molded article).

Here, the raw materials in Tables 3 and 4 are follows.
<Polylactic Acid Resin>
*1: polylactic acid resin (poly-L-lactic acid, manufactured by Nature Works LLC, Nature Works 4032D, optical purity: 98.5%, melting point: 160° C., weight-average molecular weight: 180,000)
<Crystal Nucleating Agent>
As listed in Table 2
<Plasticizer>
*2: (MeEO$_3$)$_2$SA, a diester compound obtained in Production Example 1 mentioned above, formed between succinic acid and triethylene glycol monomethyl ether, average molecular weight: 410
*3: DAIFATTY-101, a diester formed between adipic acid and a 1/1 mixture of diethylene glycol monomethyl ether and benzyl alcohol, manufactured by DAIHACHI CHEMICAL INDUSTRY CO., LTD., average molecular weight: 338
*4: (AcEO$_2$)$_3$Gly, a triester compound obtained in Production Example 2 mentioned above, formed between acetic acid and an ethylene oxide adduct in which 6 mol of ethylene oxide is added to glycerol, average molecular weight: 490
<Hydrolysis Inhibitor>
*5: Carbodilite LA-1 (manufactured by Nisshin Boseki)

The properties of the resulting sheet were evaluated in accordance with the following method. The results are shown in Tables 3 and 4.

<Transparency>

Transparency (% Haze) is measured using a haze meter HM-150 manufactured by MURAKAMI COLOR RESEARCH LABORATORY, in accordance with JIS K 7105. The smaller the numerical value, the higher the transparency.

<Yellowness>

Yellowness (b value) of a sheet is measured using a colorimeter Spectro Color Meter SE 2000, manufactured by JEOL Ltd. in accordance with JIS Z 8722. The larger the numerical value in the positive side, the stronger the yellowness.

<Semi-Crystallization Time>

A sheet was cut out to provide test pieces, and 7.5 mg of a test piece was accurately weighed, and sealed in an aluminum pan, and thereafter the test piece was melted at 200° C. for 5 minutes using a DSC apparatus (Diamond DSC, manufactured by Perkin-Elmer), and cooled to each of the temperatures (90° C., 100° C., 110° C.) at which the sample was kept at a rate of −500° C./minute, and a half of the time period for a sample to attain crystal saturation (a time period for a sample to attain a half of the crystallization degree of the saturated crystals; semi-crystallization time; $t^{1/2}$) was obtained. $t^{1/2}$ was calculated supposing that the time a sample temperature reaches a keeping temperature is 0 minutes.

thereby showing a great difference in molding rates in actual molding even while having a relative small difference in semi-crystallization time. Therefore, a resin composition having promoted crystallization by the method for promoting crystallization of the present invention has a shorter semi-crystallization time and a shorter time required for molding, thereby making it favorable in productivity. In addition, in order to shorten a semi-crystallization time in melt crystallization, it is suggest that an effect by reducing an amine value is the largest, and it can be seen that when the amine value is 1.0 mgKOH/g or less, one having a higher solidification point has favorably a shorter semi-crystallization time.

TABLE 3

| | | | | Examples | | | | | | | | |
|---|---|---|---|---|---|---|---|---|---|---|---|---|
| | | | | 1 | 2 | 3 | 4 | 5 | 6 | 7 | 8 | 9 |
| Polylactic Acid Resin | NW 4032D*[1] | | | 100 | 100 | 100 | 100 | 100 | 100 | 100 | 100 | 100 |
| Crystal Nucleating Agent | Crystal Nucleating Agent A | | | 0.5 | — | — | — | — | 0.5 | 0.5 | 0.5 | 0.5 |
| | Crystal Nucleating Agent B | | | — | 0.5 | — | — | — | — | — | — | — |
| | Crystal Nucleating Agent C | | | — | — | 0.5 | — | — | — | — | — | — |
| | Crystal Nucleating Agent D | | | — | — | — | 0.5 | — | — | — | — | — |
| | Crystal Nucleating Agent E | | | — | — | — | — | 0.5 | — | — | — | — |
| | Crystal Nucleating Agent F | | | — | — | — | — | — | — | — | — | — |
| | Crystal Nucleating Agent G | | | — | — | — | — | — | — | — | — | — |
| Plasticizer | $(MeEO_3)_2SA$*[2] | | | 10 | 10 | 10 | 10 | 10 | — | — | 10 | — |
| | DAIFATTY-101*[3] | | | — | — | — | — | — | 10 | — | — | — |
| | $(AcEO_2)_3Gly$*[4] | | | — | — | — | — | — | — | 10 | — | — |
| Hydrolysis Inhibitor | Carbodilite LA-1*[5] | | | 0.5 | 0.5 | 0.5 | 0.5 | 0.5 | 0.5 | 0.5 | — | — |
| Sheet | Transparency (% Haze) | | | 6.1 | 6.3 | 6.5 | 5.8 | 6.5 | 6.2 | 6.3 | 5.9 | 5.8 |
| | Yellowness (b Value) | | | 0.1 | 0.5 | 1.3 | 0.1 | 1.9 | 0.1 | 0.1 | 0.1 | 0.1 |
| | Semi- | Temp. | 90 | 24 | 24 | 27 | 23 | 26 | 25 | 27 | 24 | 180 |
| | Crystallization | (° C.) Kept | 100 | 18 | 20 | 26 | 18 | 24 | 21 | 24 | 18 | 83 |
| | Time $t^{1/2}$ (s) | | 110 | 30 | 36 | 40 | 28 | 38 | 37 | 40 | 30 | 76 |

TABLE 4

| | | | | Comparative Examples | | | | | |
|---|---|---|---|---|---|---|---|---|---|
| | | | | 1 | 2 | 3 | 4 | 5 | 6 |
| Polylactic Acid Resin | NW 4032D*[1] | | | 100 | 100 | 100 | 100 | 100 | 100 |
| Crystal Nucleating Agent | Crystal Nucleating Agent A | | | — | — | — | — | — | — |
| | Crystal Nucleating Agent B | | | — | — | — | — | — | — |
| | Crystal Nucleating Agent C | | | — | — | — | — | — | — |
| | Crystal Nucleating Agent D | | | — | — | — | — | — | — |
| | Crystal Nucleating Agent E | | | — | — | — | — | — | — |
| | Crystal Nucleating Agent F | | | 0.5 | — | — | — | — | — |
| | Crystal Nucleating Agent G | | | — | 0.5 | 0.5 | 0.5 | 0.5 | 0.5 |
| Plasticizer | $(MeEO_3)_2SA$*[2] | | | 10 | 10 | — | — | 10 | — |
| | DAIFATTY-101*[3] | | | — | — | 10 | — | — | — |
| | $(AcEO_2)_3Gly$*[4] | | | — | — | — | 10 | — | — |
| Hydrolysis Inhibitor | Carbodilite LA-1*[5] | | | 0.5 | 0.5 | — | — | — | — |
| Sheet | Transparency (% Haze) | | | 6.8 | 7.7 | 8.0 | 8.2 | 7.8 | 8.0 |
| | Yellowness (b Value) | | | 2.9 | 3.2 | 3.3 | 3.4 | 3.1 | 3.4 |
| | Semi- | Temp. | 90 | 29 | 30 | 35 | 40 | 29 | 280 |
| | Crystallization | (° C.) | 100 | 34 | 36 | 42 | 48 | 35 | 125 |
| | Time $t^{1/2}$ (s) | Kept | 110 | 71 | 78 | 85 | 90 | 70 | 120 |

As is clear from the results of Tables 3 and 4, it can be seen that the sheets of Examples have lowered 'Transparency' and 'Yellowness' and shortened 'Semi-Crystallization Time,' as compared to the sheets of Comparative Examples. In many cases of injection molding or sheet molding, melt crystallization where cooling is carried out from a high-temperature side is employed, the molded article has heat capacity, Examples 10 and 11 and Comparative Example 7

Evaluation in Vacuum Forming

As a polylactic resin composition, raw materials for a composition listed in Table 5 (each of the raw materials were the same as those in Tables 3 and 4) were kneaded with a kneader at 180° C. (manufactured by Toyo Seiki, Labo-plastomill) for 10 minutes, and molded into a sheet-like form having dimensions of a length of 150 mm, a width of 150 mm, and a thickness of 0.4 mm with a press-molding machine at 190° C., and the molded product was cooled to 25° C. and kept as it is for 60 seconds to provide a sheet (molded article). A sheet obtained was subjected to vacuum forming by using a vacuum forming machine (Model FVS-500, manufactured by Wakisaka Engineering) to provide a molded article (see FIG. 1). Preheating was carried out by keeping a sheet in a heater box of which top and bottom heaters were set at 400° C. for 7 s, and instantly transferring to a forming zone, to carry out vacuum forming at a die temperature of 90° C.

A semi-crystallization time $tcc^{1/2}$, an index for crystallization velocity, was measured by the following measurement method, a method similar to a crystallization method upon vacuum forming (cold crystallization). In addition, a molding time necessary for mold-releasing the above-mentioned molded article upon the formation of the above-mentioned molded article was evaluated in accordance with the following criteria. Further, as to transparency of the molded article, a flat central part was cut out and measured in accordance with the following method. The results are shown in Table 5.

<Semi-Crystallization Time (Cold Crystallization)>

A sheet was cut out to provide test pieces, and 7.5 mg of a test piece was accurately weighed, and sealed in an aluminum pan, and thereafter using a DSC apparatus (Diamond DSC, manufactured by Perkin-Elmer), the test piece was melted at 200° C. for 5 minutes, rapidly cooled to 25° C. at a rate of −500° C./minute and kept thereat for one minute, and thereafter heated to each of the temperatures 70° C., 80° C., 90° C. at which a sample was kept at a rate of 500° C./minute, and a half of the time period for the sample to attain crystal saturation (a time period for the sample to attain a half of the crystallization degree of the saturated crystals; semi-crystallization time (cold crystallization); $tcc^{1/2}$) was obtained. $tcc^{1/2}$ was calculated supposing that the time a sample temperature reaches a keeping temperature is 0 minutes.

<Evaluation Criteria for Time Kept in Die Necessary for Mold Release>

A time kept in die necessary for mold release is the shortest time in which a molded article can be taken out without deformation upon demolding. The time kept in die is measured supposing that a point where a sheet obtained after pressure molding is adhered to a die is defined as an initiation point of the time kept in die, and that a point where a time period for removing a die from the sheet is defined as a terminal point of the time kept in die. The shorter the time kept in die, the faster the cold crystallization velocity of the resin composition, thereby showing excellent moldability.

<Transparency>

Transparency (% Haze) is measured using a haze meter HM-150 manufactured by MURAKAMI COLOR RESEARCH LABORATORY, in accordance with JIS K 7105. The smaller the numerical value, the higher the transparency.

TABLE 5

|  |  |  | Ex. | | Comp. Ex. |
|---|---|---|---|---|---|
|  |  |  | 10 | 11 | 7 |
| Polylactic Acid Resin | NW 4032D*1 | | 100 | 100 | 100 |
| Crystal Nucleating Agent | Crystal Nucleating Agent A | | 0.3 | — | — |
| | Crystal Nucleating Agent B | | — | — | — |
| | Crystal Nucleating Agent C | | — | — | — |
| | Crystal Nucleating Agent D | | — | — | — |
| | Crystal Nucleating Agent E | | — | 0.3 | — |
| | Crystal Nucleating Agent F | | — | — | — |
| | Crystal Nucleating Agent G | | — | — | 0.3 |
| Plasticizer | (MeEO$_3$)$_2$SA*2 | | 6.4 | 6.4 | 6.4 |
| | DAIFATTY-101*3 | | — | — | — |
| | (AcEO$_2$)$_3$Gly*4 | | — | — | — |
| Hydrolysis Inhibitor | Carbodilite LA-1*5 | | 0.5 | 0.5 | 0.5 |
| Sheet | Semi-Crystallization Time $tcc^{1/2}$ (s) | Temp. (° C.) Kept at 90 | 8 | 10 | 13 |
| | | 80 | 15 | 18 | 25 |
| | | 70 | 55 | 65 | 95 |
| Molded Article | Time (s) Kept in Die | | 6.5 | 7.5 | 15 |
| | Transparency (% Haze) | | 3.1 | 3.8 | 6.9 |

As is clear from the results of Table 5, even in cold crystallization, the sheets of Examples have shorter 'Semi-Crystallization Time,' as compared to the sheets of Comparative Examples. In many cases of thermal molding, cold crystallization in which heating is carried out from the room temperature side is employed, and as is clear from the results of Table 5, a resin composition of which crystallization is promoted according to the method for promoting crystallization of the present invention has a short semi-crystallization time even in cold crystallization, so that a time period required for thermal molding is shortened, thereby making it favorably in productivity. In addition, transparency of the molded article can also be improved.

INDUSTRIAL APPLICABILITY

The biodegradable resin composition obtainable by the method for promoting crystallization of the present invention can be suitably used, for example, in various industrial applications, such as daily sundries, household electric appliance parts, and automobile parts.

The invention claimed is:

1. A method for promoting crystallization of a biodegradable resin composition, comprising the step of melt-kneading a raw material comprising (i) ethylenebis 12-hydroxystearic amide having an amine value of 1.0 mg KOH/g or less, an acid value of 1.0 mg KOH/g or less and a solidification point 138-143° C., which is purified by thermal cleaning and/or crystallization using at least one solvent selected from the group consisting of alcoholic solvents, aromatic hydrocarbon solvents ketone solvents, and ester solvents, and (ii) a biodegradable resin.

2. The method for promoting crystallization according to claim 1, wherein the raw material further comprises an ester compound having two or more ester groups in its molecule, wherein at least one member of an alcohol component constituting the ester compound is an alcohol which is an alkylene oxide adduct of which alkylene oxide moiety having 2 to 3 carbon atoms is added in an amount of from 0.5 to 5 mol on average per one hydroxyl group.

3. A biodegradable resin composition of which crystallization is promoted by the method for promoting crystallization as defined in claim 1.

4. The biodegradable resin composition according to claim 3, wherein the biodegradable resin is a polylactic acid resin.

5. A biodegradable resin molded article, formed by molding the biodegradable resin composition as defined in claim 3 or 4.

6. A method for producing a biodegradable resin composition, comprising the step of melt-kneading a raw material comprising (i) ethylenebis 12-hydroxystearic amide having an amine value of from 0.01 to 1.0 mg KOH/g, an acid value of 1.0 mg KOH/g or less and a solidification point of 138-143° C., which is purified by thermal cleaning and/or crystallization using at least one solvent selected from the group consisting of alcoholic solvents, aromatic hydrocarbon solvents, ketone solvents, and ester solvents, and (ii) a biodegradable resin.

* * * * *